United States Patent [19]

Chevallier et al.

[11] Patent Number: 4,590,052
[45] Date of Patent: May 20, 1986

[54] PRECIPITATED SILICA HAVING IMPROVED MORPHOLOGICAL CHARACTERISTICS AND PROCESS FOR THE PRODUCTION THEREOF

[75] Inventors: Yvonick Chevallier, Decines; Jean-Claude Morawski, Chassieu, both of France

[73] Assignee: Rhone-Poulenc Chimie de Base, France

[21] Appl. No.: 720,399

[22] Filed: Apr. 5, 1985

[30] Foreign Application Priority Data

Apr. 6, 1984 [FR] France ............................ 84 05460

[51] Int. Cl.$^4$ .............................................. C09C 1/30
[52] U.S. Cl. .................................... 423/335; 423/339
[58] Field of Search ............................ 423/335, 339; 106/288 B

[56] References Cited

U.S. PATENT DOCUMENTS

| | | | |
|---|---|---|---|
| 2,713,326 | 1/1956 | Alexander et al. | 117/118 |
| 2,765,242 | 10/1956 | Alexander et al. | 117/118 |
| 3,928,541 | 12/1975 | Wason | 423/335 |
| 3,977,893 | 8/1976 | Wason | 423/335 |
| 4,045,240 | 8/1977 | Wason | 423/335 |
| 4,122,160 | 10/1978 | Wason | 423/335 |
| 4,272,509 | 6/1981 | Wason | 423/335 |
| 4,422,880 | 12/1983 | Wason | 423/335 |

OTHER PUBLICATIONS

Janzen & Kraus, "Specific Surface Area Measurement on Carbon Black" Rubber Chemistry & Technology 44 (1971), pp. 1287–1296.

*Primary Examiner*—Peter D. Rosenberg
*Attorney, Agent, or Firm*—Finnegan, Henderson, Farabow, Garrett & Dunner

[57] ABSTRACT

A precipitated silica having improved morphological characteristics and a process for making precipitated silica. In the precipitated silica of the present invention, the ratio of DBP oil index/CTAB specific surface area is between:

7 and 4 for a range of CTAB of between 50–100 $m^2/g$, 4 and 2.5 for a range of CTAB of between 100–200 $m^2/g$, 2.5 and 2 for a range of CTAB of between 200–250 $m^2/g$, 2 and 1.5 for a range of CTAB of between 250–300 $m^2/g$, and 1.5 and 1.2 for a range of CTAB of between 300–350 $m^2/g$.

19 Claims, No Drawings

PRECIPITATED SILICA HAVING IMPROVED MORPHOLOGICAL CHARACTERISTICS AND PROCESS FOR THE PRODUCTION THEREOF

BACKGROUND

Field of the Invention

The present invention relates to precipitated silica having improved morphological characteristics, including a high level of oil absorption, and to a process for producing such precipitated silica. More specifically, the invention relates to silica with an improved specific surface area-oil absorption pairing which is useful as filler in polymers requiring good insulating characteristics, as a reinforcing filler in rubbers and as reinforcing filler in thermoplastic polymers.

Background of the Invention

Morphological characteristics of precipitated silica are important to the success of the silica in various applications. Surface area and porosity, for instance, are important factors used to determine a silica's usefulness as a constituent of rubber, thermoplastic polymers and silicone polymers. The CTAB surface area is the external surface area as evaluated by the absorption of cetyl trimethyl ammonium bromide having a pH-value of 9, in accordance with the method disclosed by JAY, JANZEN and C. KRAUS in "Rubber Chemistry and Technology" 44 (1971), pages 1287-1296.

Oil absorption, a measure of pore volume, involves using a nonvolatile liquid that readily penetrates the pores in silica. The amount of oil absorbed is an indirect measure of porosity. Although a number of different "oils" may be used for this measurement, in the present application, oil absorption is evaluated in accordance with the method described in the French Standard NF.T 30-022 (March 1953), using dibutyl phthalate (DBP) as the oil.

A single characteristic, such as specific surface area or degree of oil absorption, is alone insufficient to describe a silica or to evaluate its behaviour in a given application. It is apparent that measuring and controlling characteristics such as surface area and porosity are important to the formation of silica with desired characteristics and attempts have been made for a long period of time to improve control over these attributes of precipitated silicas.

The preparation of precipitated silica is governed by a complex process in which monomer species is formed, the monomer species polymerises and finally a gel is formed. The gel may subsequently be milled to provide a product of chosen consistency. The term gel as it is used in the following description, is defined in Iler, "Colloid Chemistry of Silica and Silicates," p. 130, Cornell University Press, 1955, the teachings of which are incorporated herein by reference.

According to French Pat. No. 1,064,230, the following are among the operating conditions which should be monitored during production because of their effect on morphological characteristics of silica:

(1) The proportion of $SiO_2$ in the alkaline silicate solution;
(2) The concentration of the soluble alkali metal salt (such as sodium chloride) in the silicate solution;
(3) The reaction temperature;
(4) The speed of addition of the acid to the solution; and
(5) The other components found in the acid used.

U.S. Pat. No. 2,731,326 and U.S. Pat. No. 2,765,242 propose forming a sol of ultimate particles and coagulating those particles to form aggregates, or gelating the sol, and reinforcing the structure of the resulting gel. U.S. Pat. No. 3,954,944 describes a sol that is formed with the simultaneous addition of acid and a silicate solution. The following steps are taught:

simultaneous addition of sulphuric acid and a solution of silicate to form an aqueous silica sol, the addition of acid and silicate being controlled to give a suitable level of concentration of silica and a suitable degree of neutralization;

aging the resulting sol;

flocculating the aged sol by the introduction of an alkali metal salt (generally NaCl); and adding more acid alone or together with silicate, to provide a selected pH-value.

The teachings of all three of the foregoing U.S. Patents are incorporated herein by reference.

As the foregoing patents indicate, the reactions for polymerizing the silicic species to a particle and the reaction for flocculation or coagulation of the colloidal particles into aggregates, are competitive in the presence of an electrolyte. That is, the salt added to the silicate solution enhances particle growth but also enhances coagulation or flocculation of particles to form aggregates. See, U.S. Pat. No. 3,969,266.

In accordance with French Pat. No. 1,064,230 it is known that by treating a solution of silicate containing sodium chloride with carbon dioxide or by increasing the amount of sodium chloride, it is possible to reduce the specific surface area of the silica.

As explained by Iler in "Colloid Chemistry of Silica and Silicates," page 108, Cornell University Press, 1955, at a pH-value of higher than 4 or 5, a sol becomes less stable and undergoes gelation more rapidly if an electrolyte is added.

Iler, writing almost twenty five years after publication of his 1955 book on silica and silicates, recognized that in spite of half a century of research, the mechanism involved in coagulation by electrolytes is not yet completely understood. Iler, The Chemistry of Silica, page 374, Wiley & Sons, 1979. That indicates that at the present time, the level of understanding of aggregation is not sufficient to be able to foresee the conditions which result in silicas of given types. Because of this uncertainty, improvement in the characteristics of precipitated silicas has been limited. Premature aggregation, of course, is undersirable because the specific surface area of the product precipitated silica is reduced.

As the foregoing demonstrates, controlling the morphological characteristics of precipitated silica is difficult. It becomes even more difficult under the constraints imposed by an industrial process, which ordinarily involve: high levels of reactant concentration, short processing times, minimum number of unitary operations and the need for low energy and capital investment costs.

The difficulties encountered in controlling morphological characteristics of silica have meant that certain applications have remained the reserve of combustion silicas. Unfortunately, the cost of the latter is very high in comparison with that of precipitated silicas.

European Application No. 31,271 claimed a substantial advance in precipitation silicas, approaching the values of combustion silicas in terms of specific surface area-oil absorption pairing, while unfortunately still being limited in terms of a process for producing the silicas.

It is an object of the present invention to produce a precipitation silica (precipitated silica) which has an improved oil absorption—surface area ratio, and which is particularly useful (1) as a filler in silicone type polymers having strict requirements regarding electrical properties; (2) as a reinforcing filler in rubbers; and (3) as a reinforcer of thermoplastic polymers.

SUMMARY OF THE INVENTION

According to the present invention, precipitation silica is provided having a BET surface area between about 50 and 350 $m^2g$, a CTAB specific surface area between 50 and 350 $m^2/g$ and wherein, as CTAB specific surface increases, the ratio DBP/CTAB decreases. The precipitation silica of the present invention has a value of oil absorption such that the ratio of DBP/CTAB is between:

(a) 7 and 4 for a CTAB range between 50–100 $m^2/g$;
(b) 4 and 2.5 for a CTAB range between 100–200 $m^2/g$;
(c) 2.5 and 2 for a CTAB range between 200–250 $m^2/g$;
(d) 2 and 1.5 for a CTAB range between 250–300 $m^2/g$; and
(e) 1.5 and 1.2 for a CTAB range between 300–350 $m^2/g$.

The invention also relates to a process for producing precipitated silica. The process comprises:

(a) forming a vessel bottoms containing from about 60 to 100% by weight of silicate;
(b) adding acid until a gel appears, with time and temperature conditions during said addition regulated to provide gelation between about 10 and 15 minutes;
(c) stopping addition of said acid for about 5 to 30 minutes and aging said gel;
(d) adding acid after said aging ends until the pH-value is at most equal to about 9;
(e) effecting post-treatment to provide a pH-value of between about 7 and 9;
(f) filtering, washing and drying said gel and recovering the product obtained; and
(g) introducing an electrolyte in an amount effective to improve the DBP/CTAB ratio in at least one of steps (a), (b), (c), (d) or (e).

DETAILED DESCRIPTION OF THE INVENTION

Addition of electrolyte during the production of precipitation silica has been thought to result in a reduction in the specific surface area of the silica. The inventors have found, contrary to the teachings of the art, that under certain conditions it is possible to observe an improvement in the oil absorption/specific surface area (DBP/CTAB) ratio so that a precipitation silica with high oil absorption is provided while the specific surface area of the silica is maintained within acceptable limits or even improved.

The modification in results can be achieved by controlling an array of parameters. The process of the invention comprises the following steps:

(a) forming a vessel bottoms containing a part of the total silicate;
(b) adding an acid until the gel appears;
(c) stopping the addition of acid and aging of the gel;
(d) adding acid;
(e) effecting post-treatment;
(f) filtering, washing and drying the suspension and recovering the product obtained.

In the foregoing process steps:
the vessel bottoms in step (a) contain from 60 to 100% by weight of silicate;
in step (b), the time/temperature pairing is regulated to cause gelation between about 10 and 50 minutes;
gelation is stopped after from about 5 to 30 minutes;
after gelation is stopped, the addition of acid is resumed to give a pH-value which is at most equal to about 9, followed then by a post-treatment
an electrolyte is introduced in at least one of steps (a), (b), (c), (d) and (e).

The post-treatment generally consists in simultaneous addition of reagents (acid and silicate) at pH-value of between about 7 and 9; in some cases it also consists in treatment with acid at decreasing pH-value.

The electrolyte preferably comprises a salt selected from the group consisting of alkali metal and alkaline earth metal salts. According to the invention, the electrolyte may be introduced either before or after the appearance of the gel or at the appearance of the gel, on one or more occasions. Surprisingly, the inventors have found that even when the electrolyte was added before the appearance of the gel, it was possible to provide a product with both a high specific surface area and a substantial level of oil absorption.

In preferred embodiments of the present invention, the electrolyte is an alkali metal salt or an alkaline earth metal salt. When the electrolyte is an alkali metal salt, the electrolyte concentration ranges from about 0.05 to 0.7 mole per liter of the reaction volume at the moment of the addition step. When the electrolyte is an alkaline earth metal salt, the electrolyte concentration ranges from about 0.001 to 0.01 mole per liter of the reaction volume at the moment of the addition step.

The acid preferably is a concentrated acid, more preferably, sulphuric acid. However, it is possible to use other liquid or gaseous acidifying agents, such as, for example, $CO_2$.

The process of the present invention makes it possible to use high reaction temperatures of the order of 70° to 95° C. and reaction times which are compatible with the requirements of industrial production. It is possible to maintain the same temperature throughout the reaction or to adopt a non-uniform temperature profile. In particular, it is possible to provide for a temperature rise in step (d).

The drying operation and subsequent operations must be such that they do not detrimentally affect the structure of the silica obtained in the precipitation stage. An advantageous form of drying operation comprises carrying out a process in accordance with French Patent Application No. 2,257,326, the disclosure of which is specifically incorporated by reference herein. This drying process involves forming a symmetrical vortex spinning flow configuration, with a hot gas, having a high degree of momentum, and introducing the suspension along the axis of symmetry of revolution of the flow, in the relative depression area thereof, the momentum of said vortex-spinning flow configuration which is symmetrical with respect to the spinning flow of the suspension being sufficient to cause the axial flow to be broken up, dispersed and taken over.

According to the present invention, a high value of oil absorption (DBP) is maintained in silicas with large CTAB surface areas. That is an important result, particularly for silicas used to reinforce elastomers and as thickening agents. The silicas of the present invention are particularly useful in reinforcing elastomers such as rubbers and in improving the resistance of rubbers to abrasion. Moreover, where the precipitated silicas of the present invention are to be used in polymers requiring electrical insulation qualities such as silicones, they have a desirably low residual sodium content.

The precipitated silicas of the present invention may be in powder form, with the size of the particles depending on the application envisaged.

The silicas of the invention are preferably non-microporous, that is to say, they may have a ratio of BET surface area to CTAB surface area of from between 1 to 1.2. Finally, the pH-value of precipitated silicas, formed in accordance with the present invention, may vary between about 3.5 and 7.5, depending on the use envisaged.

The present invention will be more readily appreciated by reference to the following examples which are given only by way of illustration. In all the examples, the drying operation is performed using an apparatus in accordance with French Patent Application No. 2,257,326, with a gas inlet temperature of 500° C. and a gas outlet temperature of 150° C. Oil absorption is measured in accordance with the French standard NF T 30-0-22, using dibutyl phthalate (DBP) as the oil, while the specific volume $V_o$ is determined in the following manner:

using a die with an inside diameter of 25 mm and a height of 80 mm, 3 g of silica is added; disposed thereabove is a piston to which a given weight is added so as to apply a pressure of $4.10^5$ Pa to the silica. The specific volume of the silica is then measured. That is the volume "$V_o$" expressed in cm$^3$/g (initial volume).

The following Table summarizes the values obtained in Examples 1-21, set forth below, with respect to CTAB specific surface areas and DBP oil absorption. Example 1 is a comparative example; Examples 2-21 fall within the scope of the invention. Unless indicated to the contrary in the Examples, the values for the BET surface areas are identical to those given in the Table for the CTAB surface areas.

TABLE

| EXAMPLES | CTAB surface area m$^2$/g | DBP oil absorption cm$^3$/100 g |
|---|---|---|
| 1 (comparative) | 200 | 466 |
| 2 | 140 | 428 |
| 3 | 120 | 388 |
| 4 | 100 | 374 |
| 5 | 110 | 400 |
| 6 | 200 | 500 |
| 7 | 175 | 464 |
| 8 | 250 | 500 |
| 9 | 130 | 490 |
| 10 | 165 | 510 |
| 11 | 200 | 500 |
| 12 | 180 | 496 |
| 13 | 166 | 502 |
| 14 | 320 | 380 |
| 15 | 200 | 500 |
| 16 | 125 | 400 |
| 17 | 270 | 420 |
| 18 | 255 | 410 |
| 19 | 300 | 410 |
| 20 | 55 | 290 |
| 21 | 93 | 380 |

EXAMPLE 1

A reference precipitation is effected, without the addition of salt (electrolyte). Using a stainless steel reaction vessel which has a volume of 20 liters and which is provided with an agitator system (a Lightnin turbine having 6 blades and 4 counter-blades disposed at 90°) and which is also provided with a double-jacket heating system, the following are introduced with agitation and at ambient temperature:

11.47 liters of distilled water; and
2 liters of aqueous sodium silicate with a SiO$_2$/Na$_2$O ratio by weight of 3.37 and containing 370 g of SiO$_2$ per liter.

The resulting mixture is raised, with agitation, to a temperature of 90° C.±1° C. in about 30 minutes. The reaction for precipitation of the silica is then performed, the temperature being maintained at 90° C.±1° C., with the speed of agitation being fixed at 350 rpm.

An aqueous solution of sulphuric acid containing 366 g of H$_2$SO$_4$ per liter is introduced into the mixture by means of a metering pump. This operation is performed at a flow rate of 12 ml per minute. After 37 minutes and 30 seconds of reaction, the gel appears; the introduction of acid is then stopped and a maturing (aging) operation is performed, for 15 minutes. After that period of time, the aqueous solution of sulphuric acid is again introduced at a flow rate of 12 ml per minute, for a period of 37 minutes. After that period, that is to say, 89 minutes and 30 seconds after the beginning of the reaction (89 minutes 30 seconds=37 minutes 30 seconds+15 minutes+37 minutes), there follows an operation of simultaneously introducing on the one hand the solution of acid containing 366 g of H$_2$SO$_4$ at a flow rate of 5.9 ml per minute and a freshly prepared aqueous solution of sodium silicate with an SiO$_2$/NaO$_2$ ratio by weight of 3.37, containing 55 g per liter of SiO$_2$, that solution being introduced at a flow rate of 82 ml per minute.

The simultaneous introduction of acid and solution of silicate is effected over a period of 40 minutes, and the pH-value of the reaction mixture is 7.5±0.2 at 90° C.

After the above-indicated period of 40 minutes for the simultaneous addition of acid and silicate, the introduction of silicate is stopped and the introduction of acid is maintained. The pH-value of the silica slurry formed is thus adjusted to 3.5 in 10 minutes. The resulting silica slurry is then filtered. The wet cake is washed to remove the sodium sulphate formed in the precipitation operation, and then dried. The physical-chemical characteristics of the silica are as follows:

| CTAB surface area | 200 m$^2$/g |
|---|---|
| BET surface area | 200 m$^2$/g |
| DBP oil absorption | 466 cm$^3$/100 g |
| Specific volume (Vo) | 5.14 cm$^3$/g |
| pH-value with 5% in water | 6.3 |

EXAMPLES 2 TO 5

These Examples involve using similar conditions except that an electrolyte is added at the 20th minute. That causes the gel to appear more rapidly.

In Example 2, 0.7 l of an aqueous solution of Na$_2$SO$_4$ containing 350 g/l is added.

In Example 3, 1.26 l of an aqueous solution of Na$_2$SO$_4$ containing 350 g/l is added.

In Example 4, 1.80 l of an aqueous solution of Na$_2$SO$_4$ containing 350 g/l is added.

In Example 5, 2.60 l of an aqueous solution of Na$_2$SO$_4$ containing 350 g/l is added.

It is found that, for Examples 2 to 5, there is a decrease in specific surface area but an increase in the ratio DBP/CTAB, up to a high value. (See the Table).

EXAMPLE 6

Operation is as in Example 1, except that 0.85 l of the same solution of $Na_2SO_4$ set forth in Example 2 is added at the 42nd minute.

The value of the specific surface area is maintained, the oil absorption value increases and the ratio is at a high level for the surface areas and oil absorption value in question, as seen in the Table.

EXAMPLE 7

This Example is comparable to Example 6, but with the following alterations:
a silicate with a weight ratio of 3.25 is used,
the introduction of acid is stopped in the 33rd minute, and
in the 75th minute, 1.34 l of an aqueous solution of $Na_2SO_4$ containing 350 g/l is introduced, but no $Na_2SO_4$ is added at the 42nd minute.

The values in respect of CTAB, oil absorption and the CTAB/oil absorption ratio verify the results of Example 6.

EXAMPLE 8

This Example corresponds to a test on a pilot scale with a vessel bottoms comprising:
112.5 l of permuted water, and
35 kg of silicate with a ratio by weight of 3.35 and containing 370 g/l of $SiO_2$.

The other operating conditions (stopping and aging) remain the same as in Example 1 except for the starting temperature which is 75° C., the temperature of the simultaneous addition operation which is 85° C., and an addition of 4 kg of salt in the 89th minute.

It will be noted that the oil absorption value remains high in spite of the value of the CTAB surface area itself being substantial.

EXAMPLE 9

The following are introduced into a 20 liter reaction vessel as described in Example 1:
10 liters of distilled water;
1.6 liter of aqueous sodium silicate with a weight ratio $Rp = SiO_2/Na_2O$ of 3.37, containing 370 g of $SiO_2$ per liter; and
1.9 liter of water containing 151 g of dissolved $Na_2SO_4$.

The resulting mixture which is maintained in an agitated condition is raised to 90° C. in about 30 minutes. That temperature is held constant to within 1° C. throughout the silica precipitation operation:
30% sulphuric acid is added until the gel is formed in the 34th minute,
the addition of acid is resumed in the 49th minute and acid and silicate are added simultaneously between the 109th and 149th minute, to give a constant pH-value of 7.5, then acidification is continued until the pH-value is 3.5.

Filtration, washing and drying are effected, as described in Example 1.

EXAMPLE 10

The following are introduced into the reaction vessel in an agitated condition and at ambient temperature:
10 liters of permuted water;
1.6 liter of aqueous sodium silicate with a weight ratio of 3.37, containing 370 g/l of $SiO_2$; and
151 g of $Na_2SO_4$ in solution in 1.9 liters of water.

The resulting mixture is raised with agitation to a temperature of 90° C.

Sulphuric acid is added until the gel forms in the 28th minute.

The addition of acid is resumed in the 42nd minute.

A simultaneous addition is effected between the 89th and the 129th minutes, to a pH-value of 7.5, then acidification continues until the pH-value is 3.5

The temperature is maintained constant to within 1° C. throughout the operation.

To show the improvement afforded by a silica of the present invention in rubber, a test is carried out comparing the silica produced in this Example 10 with a silica having BET and CTAB surface areas of 175 m²/g and an oil absorption value of 340 cm³/100 g.

The following formula is used, in parts by weight:

| | |
|---|---|
| Butadiene styrene copolymers (SBR 1502) | 100 |
| Zinc oxide | 4.00 |
| Stearic acid | 1.50 |
| N—isopropyl-N—phenyl-N'—phenyl-p-phenylene diamide (antioxygen PERMANAX ® IPPD) | 1.50 |
| N—(dimethyl-1,3-butyl-N'—Phenyl-p-phenylene diamine (anti-oxygen PERMANAX ® 6PPD) | 1.50 |
| Silica | 40 |
| Polyethylene glycol (PEG 4000) | 2 |
| N—cyclohexyl-2-benzothiazol sulphenamide (Vulcafor ® CBS) | 2 |
| Sulphur | 2.50 |
| mercapto propyldimethoxysilane (A 189) | 0.4 |

MODE OF OPERATION

Banbury:
SBR
Silica (90%) + ZnO + antioxygen + stearic acid + PEG
Oil + silica (10%) + additive (if appropriate)
End of the working or mixing operation 120° C.
Calendering with the mixer open
Mixer open:
Mixture + sulphur + accelerator
Mixing
Fining down
Drawing in sheet form

RESULTS

Resistance to abrasion in accordance with DIN 53316

| | |
|---|---|
| Reference silica having the same specific surface area | 102.8 mm³ |
| Silica according to the invention | 94.8 mm³ |

A significant improvement in resistance to abrasion is therefore found.

EXAMPLE 11

Using the reaction vessel described in Example 1, the following are introduced, with agitation:
8 liters of distilled water;
1.6 liter of silicate with a $SiO_2/Na_2O$ weight ratio of 3.37, with $SiO_2 = 370$ g/l; and
3.88 liters of water containing 339 g of $Na_2SO_4$ in the dissolved condition.

The resulting mixture is raised in an agitated condition to 70° C.±1° C. in about 20 minutes. An aqueous solution of sulphuric acid containing 366 g/l is introduced into that mixture, at a rate of 9.8 ml per minute. After 28 minutes, the silica gel is seen to appear, and the operation of introducing acid is stopped, followed by an aging operation for 15 minutes, the reaction mixture being maintained in a agitated condition (350 rpm). After that period of time, the aqueous solution of sulphuric acid ($H_2SO_4=366$ g/l) is again introduced at a rate of 10.2 ml/minute, for a period of 45 minutes. The rise in temperature occurs in the 75th minute, just before the post-addition operation, the temperature reaching 78° C. at the beginning of the post-addition operation and 83° C. afterwards. Eighty-eight minutes after the beginning of the reaction (88 minutes=28+15+45 minutes), there is effected the operation of simultaneously introducing the aqueous solution of sulphuric acid (366 g/l) at a rate of 5.1 ml per minute and a freshly prepared aqueous solution of sodium silicate ($SiO_2/Na_2O$ weight ratio of 3.37), containing 45 g of $SiO_2$ per liter, that solution being introduced at a rate of 82 ml per minute. The simultaneous introduction of acid and silicate is effected for a period of 40 minutes, and the pH-value of the reaction medium is maintained at 7.5±0.2 at 83° C.

The introduction of silicate is then stopped and the introduction of acid is maintained so as to adjust the pH-value to 3.5 in 10 minutes.

After filtering, washing and drying, the result is a silica which has the following characteristics:
a CTAB specific surface area of 200 $m^2/g$; and
a BET specific surface area of 200 $m^2/g$.

EXAMPLES 12 AND 13

These Examples describe modes of operation wherein the addition of salt is effected in two phases:
(a) to the aqueous solution of sodium silicate forming the vessel bottoms,
(b) at the moment of the gel (Example 12) or after the gel (Example 13).

Operation is as in Example 11, but with the following alterations:
the silicate used has a weight ratio of 3.25 (instead of 3.37); and
1.34 l of an aqueous solution of $Na_2SO_4$ containing 350 g/l is introduced;
to the gel (Example 12)
in the 75th minute (Example 13).

The results obtained are to be compared to those of Examples 6, 7, 8 and 11 in particular.

An improvement in the pairing DBP/CTAB ratio is observed, while maintaining a comparable specific surface area.

EXAMPLE 14

The following are introduced with agitation into the reaction vessel described in Example 1:
10 liter of distilled water,
1.6 liter of aqueous sodium silicate with a $SiO_2/Na_2O$ weight ratio of 3.37 and containing 370 g of $SiO_2$ per liter; and
1.88 liter of aqueous solution containing 151 g of $Na_2SO_4$.

The resulting mixture is raised with agitation to a temperature of 70° C.±1° C. in about 20 minutes. The precipitation reaction is then carried out.

An aqueous solution of sulphuric acid containing 366 g per liter of $H_2SO_4$ is introduced into the mixture by means of a metering pump. This introduction operation is performed at a rate of 10 ml per minute.

Forty-two minutes after beginning the operation of introducing the acid, the gel is seen to appear; the acid introduction operation is then stopped, and a maturing operation is performed for 15 minutes, with agitation. The aqueous sulphuric acid is again introduced, in the 57th minute, at rate of 10 ml per minute, for a period of 31 minutes.

From the 88th minute, there is effected the operation of simultaneously introducing the acid solution containing 366 g of $H_2SO_4$ per liter, at a rate of 4.9 ml per minute, and an aqueous solution of sodium silicate, with an $SiO_2/Na_2O$ weight ratio of 3.37 and containing 45 g of $SiO_2$ per liter, that solution being introduced at a rate of 82 ml per liter. The simultaneous introduction of acid and aqueous sodium silicate takes place over a period of 40 minutes.

The reaction temperature is fixed at 70° C.±1° C. at the beginning of the reaction, up to the 75th minute. In the 75th minute, the temperature is increased by heating. The temperature of the reaction medium is 78° C. at the 88th minute, that is to say at the beginning of the operation of simultaneously adding acid and aqueous sodium silicate, and it is subsequently maintained at 83° C.±1° C.

After the 40 minute period of the simultaneous addition operation, the introduction of silicate is stopped and the introduction of sulphuric acid is continued so as to adjust the pH-value to 3.5 in about 10 minutes.

The resulting silica suspension is filtered. The silica cake which is separated out on the filter is washed with water. That slurry is then dried in an atomizer, as described in Example 1.

The resulting silica has a CTAB specific surface area of 320 $m^2/g$, and a BET specific surface area of 310 $m^2/g$.

EXAMPLE 15

Operation is as described in Example 1 except that 0.5 liters of aqueous solution containing 8.5 g of calcium acetate is introduced in the 20th minute. The gel appears at the 34th minute instead at 37 minutes 30 seconds as in Example 1. Maturing is then effected for 15 minutes, with agitation, and the sulphuric acid (366 g/l) is re-introduced in the 49th minute, at a rate of 12 ml per minute, up to the 89th minute. That is then followed by the operation of simultaneously introducing sulphuric acid ($H_2SO_4=366$ g/l) and aqueous sodium silicate (with an $SiO_2/Na_2O$ weight ratio of 3.37, and containing 55 g of $SiO_2$ per liter).

The acid is introduced at a rate of 6 ml per minute and the silicate at a rate of 81.5 ml per minute. The simultaneous introduction operation is performed for a period of 40 minutes, with the temperature being maintained from the beginning of the reaction at 90° C.±1° C.

The introduction of silicate is then stopped while the introduction of acid is continued for about 10 minutes, so as to give a pH-value of 3.5.

The resulting silica slurry is then filtered. The silica cake which is separated out on the filter is washed with water and that slurry is then dried in an atomizer as described in Example 1.

The silica has a CTAB specific surface area of 200 $m^2/g$ and a BET specific surface area of 200 $m^2/g$.

EXAMPLE 16

The following are introduced into the reaction vessel described in Example 1, with agitation:
  10.47 liters of distilled water,
  2 liters of aqueous sodium silicate with an $SiO_2/Na_2O$ weight ratio of 3.25 and with an $SiO_2$ concentration of 370 g/l, and
  1 liter of water containing 245 g of $Na_2SO_4$ in the dissolved state.

The resulting mixture is raised with agitation to a temperature of 90° C.±1° C. in about 30 minutes. An aqueous solution of sulphuric acid with a content of 366 g/l is introduced into the above-indicated mixture, at a rate of 24.7 ml per minute. After 12 minutes, the silica gel is seen to appear and the operation of introducing acid is stopped, followed by a 15 minute aging operation, with the reaction mixture being maintained in an agitated condition (350 rpm). After that period, the aqueous solution of sulphuric acid ($H_2SO_4$=366 g/l) is again introduced at a rate of 24.9 ml/minute, for a period of 25 minutes. Fifty-two minutes after the beginning of the reaction (52 minutes=12+15+25 minutes), there follows the operation of simultaneously introducing the aqueous solution of sulphuric acid (containing 366 g/l), at a rate of 6.4 ml per minute, and a freshly prepared aqueous solution of sodium silicate ($SiO_2/Na_2O$ weight ratio of 3.25), containing 55 g of $SiO_2$ per liter. The silicate solution is introduced at a rate of 81 ml per minute. The operation of simultaneously introducing acid and silicate is carried on for 40 minutes, with the pH-value of the reaction medium being maintained at 7.5±0.2 at 90° C.

The introduction of the silicate is then stopped while the introduction of acid is continued so as to adjust the pH-value to 3.5 in 15 minutes.

After filtration, washing and drying by means of the same atomizer, the product obtained is a silica which has the following characteristics:
  a CTAB specific surface area of 123 $m^2/g$; and
  a BET specific surface area of 122 $m^2/g$.

EXAMPLE 17

This Example uses a reaction vessel which has a volume of 20 liters, as described in Example 1.

The following are introduced into the reaction vessel:
  10.9 liters of water containing 135 mg of $Ca(OH)_2$, and
  2.28 liters of aqueous sodium silicate with an $SiO_2/Na_2O$ weight ratio of 3.37, containing 318 g of $SiO_2$ per liter.

The resulting mixture is agitated and the temperature is raised to 90° C.±1° C. The precipitation reaction is then carried out. An aqueous solution of sulphuric acid containing 366 g of $H_2SO_4$ per liter is introduced into the agitated mixture (speed of agitation of the turbine being 350 revolutions per minute). The operation of introducing the aqueous solution is performed at a rate of 12 ml per minute. The gel is seen to appear after 32 minutes of reaction, when the operation of introducing acid is stopped and a 15 minute aging operation is carried out. After that period of time, the aqueous solution of sulphuric acid is again introduced, at a rate of 12 ml per minute, for a period of 34 minutes. After that period, being therefore 32+15+34=81 minutes after the beginning of the reaction, the pH-value of the suspension is 7.8±0.1 at 90° C., and there then follows the simultaneous addition to the reaction mixture, at two clearly different locations, of an aqueous solution of sulphuric acid ($H_2SO_4$=366 g/l) and a freshly prepared aqueous solution of sodium silicate, with an $SiO_2/Na_2O$ weight ratio of 3.37, containing 55 g of $SiO_2$ per liter.

The simultaneous addition operation is carried out over a period of 40 minutes at 90° C., in the following manner:
  the solution of aqueous sodium silicate is introduced at a rate of 82 ml per minute, and the aqueous sulphuric acid is introduced at a rate which decreases in time so as to give a continuous drop in the pH-value from 7.8±0.1 to a value of 3.5±0.1.

After filtration of the resulting silica suspension, washing with distilled water and drying by means of an atomizer as described in Example 1, the product obtained is a silica powder having the following characteristics:
  CTAB surface area=270 $m^2/g$
  BET surface area=270 $m^2/g$
  DBP oil absorption=420 ml for 100 g of silica
  pH-value=5.0.

EXAMPLE 18

The following are introduced into a 20 liter reaction vessel as described in Example 1:
  10.83 liters of distilled water, and
  2.64 liters of aqueous sodium silicate with an $SiO_2/Na_2O$ weight ratio of 3.7, containing 282 g of $SiO_2$ per liter.

The resulting mixture is raised with agitation to a temperature of 90°±1° C., in about 30 minutes. An aqueous solution of sulphuric acid containing 366 g of $H_2SO_4$ per liter is introduced into the mixture, by means of a metering pump. That solution is introduced at an average flow rate of 11 ml per minute over a period of 41 minutes. At that time, the gel is seen to appear; the addition of acid is stopped and a 15 minutes maturing operation is carried out. In the 44th minute, 0.9 l of an aqueous solution of $Na_2SO_4$ containing 350 g of $Na_2SO_4$ per liter is introduced. In the 56th minute, the aqueous solution of sulphuric acid is again introduced at a rate of 11 ml per minute, for a period of 32 minutes. After that period, that is to say, at 88 minutes after the beginning of the reaction (88 minutes=41+15+32 minutes), there follows the operation of simultaneously introducing into the reaction medium, the aqueous solution of sulphuric acid containing 366 g of $H_2SO_4$ per liter, at a rate of 11 ml per minute, and a freshly prepared aqueous solution of sodium silicate, with an $SiO_2/Na_2O$ weight ratio of 3.7, containing 55 g of $SiO_2$ per liter, the sodium silicate solution being introduced at a rate of 80 ml per minute.

The operation of simultaneously introducing acid and aqueous sodium silicate is performed over a period of 40 minutes, with the temperature being maintained at 90° C.±1° C.

After the 40 minute period of simultaneously adding acid and aqueous sodium silicate, the introduction of the aqueous solution of sodium silicate is stopped while the introduction of acid is maintained. The pH-value of the silica slurry formed is thus adjusted to a value of 3.5 in 10 minutes.

The resulting silica slurry is then filtered and the resulting wet cake is washed with distilled water to remove the sodium sulphate which was formed during the precipitation step. The washed cake is then dried as described in Example 1.

The physical-chemical characteristics of the silica are as follows:
CTAB suface area=255 m²/g
BET surface area=260 m²/g
DBP oil absorption=410 ml for 100 g of silica
pH-value=4.5.

EXAMPLE 19

The precipitation operation is performed as described in Example 18, but with the following differences:

the phase of simultaneously introducing aqueous sulphuric acid and aqueous sodium silicate is replaced by a reaction phase which involves introducing solely aqueous sulphuric acid ($H_2SO_4$=366 g/l). That operation takes a period of 30 minutes, with the reaction suspension being maintained with agitation at 90° C.±1° C.

The flow rate of the acid is controlled in such a way as to decrease with respect to time, so as to give a continuous drop in the pH-value from 7.8±0.1 to 3.5±0.1.

After filtration, washing and drying with the same atomizer as described above, the silica produced has the following characteristics:
CTAB surface area=300 m²/g
BET surface area=310 m²/g
DBP oil absorption=410 ml for 100 g of silica
pH-value=4.8.

EXAMPLE 20

The following are introduced into a reaction vessel having a volume of 20 liters, as described in Example 1:
8 liters of permuted water,
2.15 liters of aqueous sodium silicate having an $SiO_2$/$Na_2O$ weight ratio of 3.35 and containing 370 g of $SiO_2$ per liter; and
3.32 liters of aqueous solution containing 339 g of $Na_2SO_4$.

The resulting mixture is agitated (speed of the turbine: 350 revolutions power minute) and raised to 90° C. in about 30 minutes. An aqueous solution of sulphuric acid containing 366 g of $H_2SO_4$ per liter is then introduced into the mixture by means of a metering pump. That operation is performed at an average flow rate of 13.1 ml per minute, for a period of 18 minutes. At that time, the gel is seen to appear; the introduction of acid is stopped and a 15 minute maturing operation is effected. After that period, that is to say, in the 33rd minute from the beginning of the reaction, the aqueous solution of sulphuric acid is again introduced at a rate of 12.8 ml per minute, for a period of 56 minutes. After that time, that is to say, 89 minutes after the beginning of the reaction (89 minutes=18+15+56 minutes), there follows the operation of simultaneously introducing into the reaction medium on the one hand the sulphuric acid solution containing 366 g of $H_2SO_4$ per liter, at a flow rate of 6.9 ml per minute, and on the other hand a freshly prepared aqueous solution of sodium silicate, with an $SiO_2$/$Na_2O$ weight ratio of 3.35 and containing 59 g of $SiO_2$ per liter, that solution being introduced at a rate of 82 ml per minute.

The operation of simultaneously introducing acid and aqueous sodium silicate occurs over a period of 40 minutes, with the reaction suspension being maintained in an agitated condition (speed of rotation of the turbine: 350 rpm) at 90° C.±1° C.

After the 40 minute operation of simultaneously adding acid and aqueous sodium silicate, the introduction of the aqueous solution of sodium silicate is stopped while the operation of introducing the acid is continued. The pH-value of the silica slurry formed in the reaction vessel thus adjusted to 3.5 in 10 minutes.

The resulting silica slurry is then filtered. The cake which is collected on the filter is washed and then dried by means of the same atomizer.

The silica powder produced had the following characteristics:
CTAB specific surface area=55 m²/g
BET specific surface area=60 m²/g
DBP oil absorption=290 ml for 100 g of $SiO_2$
pH-value=5.9.

EXAMPLE 21

Using a stainless steel container with a volume of 20 liters and provided with an agitator system (6-vane LightNin turbine with 4 counter-vanes at 90°), also provided with a double-jacket heating system, the following are introduceed with agitation and at ambient temperature:
10.47 liters of distilled water;
2 liters of aqueous sodium silicate with an $SiO_2$/$Na_2O$ weight ratio of 3.37 and containing 370 g per liter of $SiO_2$; and
245 g of $Na_2SO_4$ in solution in a liter of distilled water.

The resulting mixture is raised with agitation to a temperature of 90° C.±1° C. in about 30 minutes. The reaction for precipitation of the silica is then effected, with the temperature being held at 90° C.±1° C. For that purpose, an aqueous solution of sulphuric acid containing 366 g of $H_2SO_4$ per liter is introduced into the mixture by means of a pump. The solution is introduced at a flow rate of 12.1 ml of acid solution. At that moment, that is to say after 22 minutes of reaction, the gel is seen to appear; the introduction of acid is stopped and a 15 minute aging operation is performed. After that period of time, the aqueous solution of sulphuric acid containing 366 g/l of $H_2SO_4$ is again introduced, at a flow rate of 12 ml per minute and for a period of 53 minutes, with a temperature of 90° C.±1° C. still being maintained. After that period, that is to say, 90 minutes (90=22+15+53) after the beginning of the reaction, there is performed an operation of simultaneously introducing into the reaction medium at two different points, the solution of acid containing 36 g/l of $H_2SO_4$, at rate of 6.8 ml per minute, and a solution of sodium silicate, with an $SiO_2$/$Na_2O$ weight ratio of 3.37 and containing 55 g per liter of $SiO_2$, that solution being introduced at a rate of 84 ml per minute.

The simultaneous introduction of acid and silicate solution takes place over 40 minutes, the pH-value of the reaction medium being 7.5±0.2 at 90° C.

After the 40 minute period of simultaneously adding acid and silicate, the introduction of silicate is stopped while the introduction of acid (366 g/l of $H_2SO_4$) is maintained, at a rate of 6.8 ml per minute; the pH-value of the silica slurry formed ($SiO_2$ at 50 g/l) is thus adjusted to 3.5 in 10 minutes.

The silica slurry produced is filtered and the cake is washed with distilled water (or possibly with less pure water). After drying, the washed wet cake results in a fine silica powder having the following characteristics:
CTAB surface area=90 m²/g
BET surface area=88 m²/g
pH-value=7.5
DBP oil absorption=380 ml per 100 g of silica.
We claim:

1. A precipitated silica having a BET surface area of between about 50 and 350 $m^2/g$, a CTAB specific area between 50 and 350 $m^2/g$ and a value of oil absorption (DBP) such that the ratio of DBP/CTAB is between:
   7 and 4 for a CTAB range between 50–100 $m^2/g$;
   4 and 2.5 for a CTAB range between 100–200 $m^2/g$;
   2.5 and 2 for a CTAB range between 200–250 $m^2/g$;
   2 and 1.5 for a CTAB range between 250–300 $m^2/g$; and
   1.5 and 1.2 for a CTAB range between 300–350 $m^2/g$.

2. A precipitated silica according to claim 1 characterized in that it has a BET surface area/CTAB surface area ratio of between 1 and 1.2.

3. A precipitated silica according to claim 2 having a pH value of about 3.5 to 7.5.

4. A precipitated silica according to claim 1 having a pH value of about 3.5 to 7.5.

5. A process for producing a precipitated silica as recited in claim 1 which comprises:
   (a) forming a vessel bottoms containing from about 60 to 100% by weight of silicate;
   (b) adding acid until a gel appears, with time and temperature conditions during said addition being regulated to provide gelation between about 10 and 15 minutes;
   (c) stopping addition of said acid for about 5 to 30 minutes and aging said gel;
   (d) adding acid after said aging ends until the pH-value is at most equal to about 9;
   (e) effecting post-treatment;
   (f) filtering, washing and drying said gel and recovering the product obtained; and
   (g) introducing an electrolyte in an amount effective to improve the DBP/CTAB ratio in at least one of steps (a), (b), (c), (d) or (e).

6. A process according to claim 5 wherein said electrolyte is a salt of an alkali metal or alkaline earth metal.

7. A process according to claim 6 wherein said electrolyte is an alkali metal salt and is added at a concentration from about 0.05 to 0.7 moles per liter of reaction volume.

8. A process according to claim 6 wherein said electrolyte is an alkaline earth metal salt and is added at a concentration from about 0.001 to 0.01 moles per liter of reaction volume.

9. A process according to claim 5 wherein said electrolyte is introduced only once.

10. A process according to claim 5 wherein said electrolyte is introduced more than once.

11. A process according to claim 5 wherein said electrolyte is introduced before said gel appears.

12. A process according to claim 5 wherein said electrolyte is introduced at the appearance of said gel.

13. A process according to claim 5 wherein said electrolyte is introduced after the gel appears.

14. A process according to claim 5 characterized in that the drying operation is performed by forming a symmetrical vortex spinning flow configuration with a hot gas having a high level of momentum and introducing the silica suspension along the axis of rotation of said flow configuration into the relative depression region thereof, the momentum of the vortex-flow configuration which is symmetrical with respect to the axial flow of the suspension being sufficient to cause the axial flow to be broken down, dispersed and taken over.

15. A reinforcing agent for elastomers comprising the precipitated silica of claim 1.

16. A thickening agent comprising the precipitated silica of claim 1.

17. A process according to claim 5 wherein said post-treatment provides a pH-value of between about 7 and 9.

18. A process according to claim 17, wherein said post-treatment comprises simultaneous addition of acid and silicate at a pH-value of between about 7 and 9.

19. A process according to claim 5 wherein said post-treatment comprises treatment with acid at decreasing pH-value.

* * * * *

UNITED STATES PATENT AND TRADEMARK OFFICE
CERTIFICATE OF CORRECTION

PATENT NO. : 4,590,052

DATED : May 20, 1986

INVENTOR(S) : CHEVALLIER ET AL.

It is certified that error appears in the above-identified patent and that said Letters Patent is hereby corrected as shown below:

Column 3, line 35, "15" should read --50--.

In claim 5, column 15, line 26, "15" should read --50--.

Signed and Sealed this

Thirtieth Day of March, 1993

Attest:

STEPHEN G. KUNIN

*Attesting Officer*      *Acting Commissioner of Patents and Trademarks*